(12) United States Patent
Chande et al.

(10) Patent No.: US 12,295,033 B2
(45) Date of Patent: May 6, 2025

(54) NETWORK CONFIGURED SENSING BANDWIDTH AND CHANNEL OCCUPANCY TIME (COT) SHARING

(71) Applicant: QUALCOMM Incorporated, San Diego, CA (US)

(72) Inventors: Vinay Chande, San Diego, CA (US); Jing Sun, San Diego, CA (US); Arumugam Chendamarai Kannan, San Diego, CA (US); Giovanni Chisci, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/657,568

(22) Filed: Mar. 31, 2022

(65) Prior Publication Data

US 2022/0322431 A1   Oct. 6, 2022

Related U.S. Application Data

(60) Provisional application No. 63/170,355, filed on Apr. 2, 2021.

(51) Int. Cl.
*H04W 74/08*   (2024.01)
*H04W 16/14*   (2009.01)
*H04W 74/0808*   (2024.01)

(52) U.S. Cl.
CPC ....... *H04W 74/0808* (2013.01); *H04W 16/14* (2013.01)

(58) Field of Classification Search
CPC ............ H04W 74/0808; H04W 16/14; H04W 74/006
See application file for complete search history.

(56) References Cited

U.S. PATENT DOCUMENTS 11,330,624 B2 *   5/2022   Wang ................ H04W 74/0808
2016/0021661 A1 *   1/2016   Yerramalli ........... H04B 17/309
                                                      370/329

(Continued)

FOREIGN PATENT DOCUMENTS

WO   WO-2021013811 A1   1/2021

OTHER PUBLICATIONS

International Search Report and Written Opinion—PCT/US2022/071498—ISA/EPO—Jun. 20, 2022.

(Continued)

*Primary Examiner* — John D Blanton
(74) *Attorney, Agent, or Firm* — Norton Rose Fulbright US LLP

(57) ABSTRACT

This disclosure provides systems, methods, and devices for wireless communication that support management of network-configured sensing bandwidths in a wireless communication system. In particular aspects, a network configures a sensing bandwidth, and the sensing bandwidth configuration is signaled to a contending node. The contending node (e.g., a UE or a base station) performs a medium sensing procedure (e.g., a listen-before-talk (LBT) procedure) using the signaled configuration of the sensing bandwidth. Aspects of this disclosure provide various techniques for signaling the configuration of the sensing bandwidth to the contending node.

30 Claims, 7 Drawing Sheets

(56) References Cited

U.S. PATENT DOCUMENTS

| | | | |
|---|---|---|---|
| 2017/0223550 A1* | 8/2017 | Takeda | H04W 74/0808 |
| 2018/0242364 A1* | 8/2018 | Park | H04W 24/08 |
| 2019/0268883 A1* | 8/2019 | Zhang | H04L 5/0094 |
| 2020/0187250 A1* | 6/2020 | Bhattad | H04W 74/002 |
| 2020/0275484 A1* | 8/2020 | Xu | H04W 74/0808 |
| 2020/0305191 A1* | 9/2020 | Moon | H04W 72/23 |
| 2020/0322982 A1* | 10/2020 | Wu | H04W 72/542 |
| 2020/0351941 A1* | 11/2020 | Aldana | H04W 72/12 |
| 2020/0374709 A1* | 11/2020 | Chen | H04W 8/24 |
| 2021/0120585 A1* | 4/2021 | Yang | H04W 76/27 |
| 2021/0259015 A1* | 8/2021 | Wang | H04W 74/0808 |
| 2021/0298056 A1* | 9/2021 | Fu | H04W 72/23 |
| 2021/0344451 A1* | 11/2021 | Hedayat | H04L 1/1819 |
| 2021/0344453 A1* | 11/2021 | Lei | H04W 72/23 |
| 2021/0392680 A1* | 12/2021 | Wang | H04W 74/002 |
| 2022/0039159 A1* | 2/2022 | Ljung | H04W 74/0808 |
| 2022/0046559 A1* | 2/2022 | Wu | H04W 52/50 |
| 2022/0061094 A1* | 2/2022 | Jung | H04W 74/0816 |
| 2022/0095301 A1* | 3/2022 | Oviedo | H04W 72/0446 |
| 2022/0150968 A1* | 5/2022 | Fehrenbach | H04W 72/23 |
| 2022/0295558 A1* | 9/2022 | Lei | H04L 5/001 |
| 2022/0330338 A1* | 10/2022 | Karaki | H04W 74/0866 |
| 2023/0080801 A1* | 3/2023 | Xu | H04W 74/0808 370/329 |
| 2023/0188275 A1* | 6/2023 | Ren | G01S 7/415 370/329 |
| 2023/0354362 A1* | 11/2023 | Xu | H04W 72/1263 |

OTHER PUBLICATIONS

Qualcomm Incorporated: "Channel Access Procedures for NR Unlicensed", 3GPP Draft, 3GPP TSG RAN WG1 Meeting #98, R1-1909245 7.2.2.2.1 Channel Access Procedures for NR Unlicensed, 3rd Generation Partnership Project (3GPP), Mobile Competence Centre, 650, Route Des Lucioles, F-06921 Sophia-Antipolis C, vol. RAN WG1, No. Prague, CZ, Aug. 26, 2019-Aug. 30, 2019 Aug. 17, 2019 (Aug. 17, 2019), XP051765850, 18 Pages, Retrieved from the Internet: URL: http://www.3gpp.org/ftp/tsg_ran/WG1_RL1/TSGR1_98/Docs/R1-1909245.zip [retrieved on Aug. 17, 2019] pp. 3-4, 2.3. UE Acquired COT Sharing p. 9, 2.9.LBT Procedure for Operation Over Multiple LBT Subbands p. 10, 2.10. Wideband LBT.

* cited by examiner

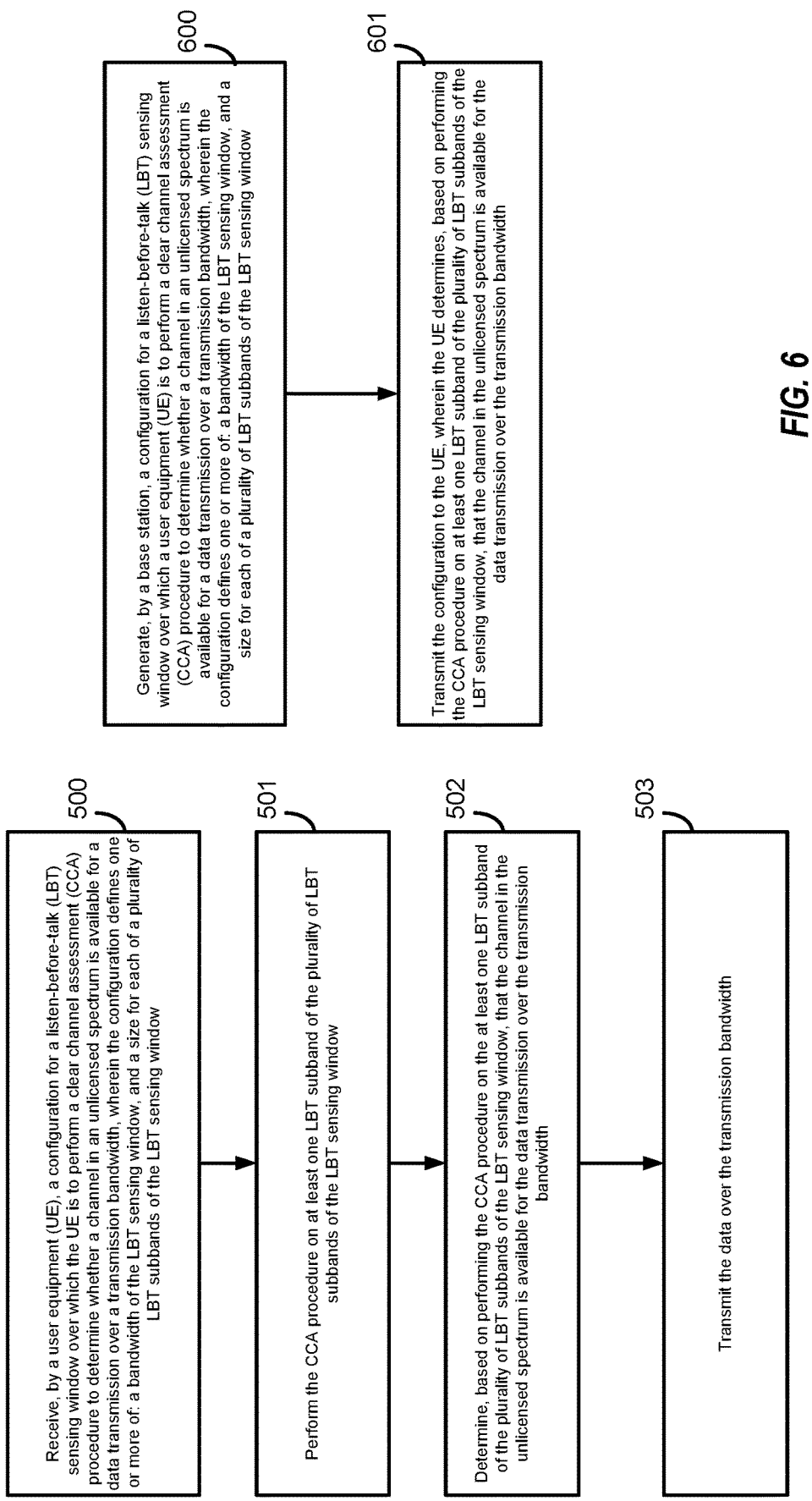

NETWORK CONFIGURED SENSING BANDWIDTH AND CHANNEL OCCUPANCY TIME (COT) SHARING

CROSS-REFERENCE TO RELATED APPLICATIONS

This application claims the benefit of assigned U.S. Provisional Patent Application No. 63/170,355, entitled, "NETWORK CONFIGURED SENSING BANDWIDTH AND CHANNEL OCCUPANCY TIME (COT) SHARING," filed Apr. 2, 2021, the disclosure of which is expressly incorporated by reference herein its entirety.

BACKGROUND

Field

Aspects of the present disclosure relate generally to wireless communication systems, and more particularly, to listen-before-transmit (LBT) operations for wireless communication systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a user equipment (UE), a configuration for a listen-before-talk (LBT) sensing window over which the UE is to perform a clear channel assessment (CCA) procedure to determine whether a channel in an unlicensed spectrum is available for a data transmission over a transmission bandwidth. The configuration defines one or more of a bandwidth of the LBT sensing window, and a size for each of a plurality of LBT subbands of the LBT sensing window. The method further includes performing the CCA procedure on at least one LBT subband of the plurality of LBT subbands of the LBT sensing window, determining, based on performing the CCA procedure on the at least one LBT subband of the plurality of LBT subbands of the LBT sensing window, that the channel in the unlicensed spectrum is available for the data transmission over the transmission bandwidth, and transmitting the data over the transmission bandwidth.

In an additional aspect of the disclosure, a method of wireless communication includes generating, by a base station, a configuration for an LBT sensing window over which a UE is to perform a CCA procedure to determine whether a channel in an unlicensed spectrum is available for a data transmission over a transmission bandwidth. The configuration defines one or more of a bandwidth of the LBT sensing window, and a size for each of a plurality of LBT subbands of the LBT sensing window. The method further include transmitting the configuration for the LBT sensing window to the UE. In aspects, the UE determines, based on performing the CCA procedure on at least one LBT subband of the plurality of LBT subbands of the LBT sensing window, that the channel in the unlicensed spectrum is available for the data transmission over the transmission bandwidth.

In an additional aspect of the disclosure, an apparatus configured for wireless communication is disclosed. The apparatus includes means for receiving, by a UE, a configuration for an LBT sensing window over which the UE is to perform a CCA procedure to determine whether a channel in an unlicensed spectrum is available for a data transmission over a transmission bandwidth. In aspects, the configuration defines one or more of: a bandwidth of the LBT sensing window, and a size for each of a plurality of LBT subbands of the LBT sensing window. The apparatus further includes means for performing the CCA procedure on at least one LBT subband of the plurality of LBT subbands of the LBT sensing window, means for determining, based on performing the CCA procedure on the at least one LBT subband of the plurality of LBT subbands of the LBT sensing window, that the channel in the unlicensed spectrum is available for the data transmission over the transmission bandwidth, and means for transmitting the data over the transmission bandwidth.

In an additional aspect of the disclosure, an apparatus configured for wireless communication is disclosed. The apparatus includes means for generating, by a base station, a configuration for an LBT sensing window over which a UE is to perform a CCA procedure to determine whether a channel in an unlicensed spectrum is available for a data transmission over a transmission bandwidth. In aspects, the configuration defines one or more of: a bandwidth of the LBT sensing window, and a size for each of a plurality of LBT subbands of the LBT sensing window. The apparatus further includes means for transmitting the configuration for the LBT sensing window to the UE. In aspects, the UE determines, based on performing the CCA procedure on at least one LBT subband of the plurality of LBT subbands of the LBT sensing window, that the channel in the unlicensed spectrum is available for the data transmission over the transmission bandwidth.

In an additional aspect of the disclosure, a non-transitory computer-readable medium having program code recorded thereon is disclosed. The program code comprises program code executable by a computer for causing the computer to receive, by a UE, a configuration for an LBT sensing window over which the UE is to perform a CCA procedure to determine whether a channel in an unlicensed spectrum is available for a data transmission over a transmission bandwidth. In aspects, the configuration defines one or more of: a bandwidth of the LBT sensing window, and a size for each of a plurality of LBT subbands of the LBT sensing window. The program code further includes program code executable by a computer for causing the computer to perform the CCA procedure on at least one LBT subband of the plurality of LBT subbands of the LBT sensing window, to determine, based on performing the CCA procedure on the at least one LBT subband of the plurality of LBT subbands of the LBT sensing window, that the channel in the unlicensed spectrum is available for the data transmission over the transmission bandwidth, and to transmit the data over the transmission bandwidth.

In an additional aspect of the disclosure, a non-transitory computer-readable medium having program code recorded thereon is disclosed. The program code comprises program code executable by a computer for causing the computer to generate, by a base station, a configuration for an LBT sensing window over which a UE is to perform a CCA procedure to determine whether a channel in an unlicensed spectrum is available for a data transmission over a transmission bandwidth. In aspects, the configuration defines one or more of: a bandwidth of the LBT sensing window, and a size for each of a plurality of LBT subbands of the LBT sensing window. The program code further includes program code executable by a computer for causing the computer to transmit the configuration for the LBT sensing window to the UE. In aspects, the UE determines, based on performing the CCA procedure on at least one LBT subband of the plurality of LBT subbands of the LBT sensing window, that the channel in the unlicensed spectrum is available for the data transmission over the transmission bandwidth.

In an additional aspect of the disclosure, an apparatus configured for wireless communication is disclosed. The apparatus includes at least one processor, and a memory coupled to the at least one processor. The at least one processor is configured to receive, by a UE, a configuration for an LBT sensing window over which the UE is to perform a CCA procedure to determine whether a channel in an unlicensed spectrum is available for a data transmission over a transmission bandwidth. In aspects, the configuration defines one or more of: a bandwidth of the LBT sensing window, and a size for each of a plurality of LBT subbands of the LBT sensing window. The at least one processor is further configured to perform the CCA procedure on at least one LBT subband of the plurality of LBT subbands of the LBT sensing window, to determine, based on performing the CCA procedure on the at least one LBT subband of the plurality of LBT subbands of the LBT sensing window, that the channel in the unlicensed spectrum is available for the data transmission over the transmission bandwidth, and to transmit the data over the transmission bandwidth.

In an additional aspect of the disclosure, an apparatus configured for wireless communication is disclosed. The apparatus includes at least one processor, and a memory coupled to the at least one processor. The at least one processor is configured to generate, by a base station, a configuration for an LBT sensing window over which a UE is to perform a CCA procedure to determine whether a channel in an unlicensed spectrum is available for a data transmission over a transmission bandwidth. In aspects, the configuration defines one or more of: a bandwidth of the LBT sensing window, and a size for each of a plurality of LBT subbands of the LBT sensing window. The at least one processor is further configured to transmit the configuration for the LBT sensing window to the UE. In aspects, the UE determines, based on performing the CCA procedure on at least one LBT subband of the plurality of LBT subbands of the LBT sensing window, that the channel in the unlicensed spectrum is available for the data transmission over the transmission bandwidth Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a flow chart illustrating a method of wireless communication performed by a UE according to some aspects of the disclosure.

FIG. 6 is a flow chart illustrating a method of wireless communication performed by a base station according to some aspects of the disclosure.

DETAILED DESCRIPTION

Figure 1:
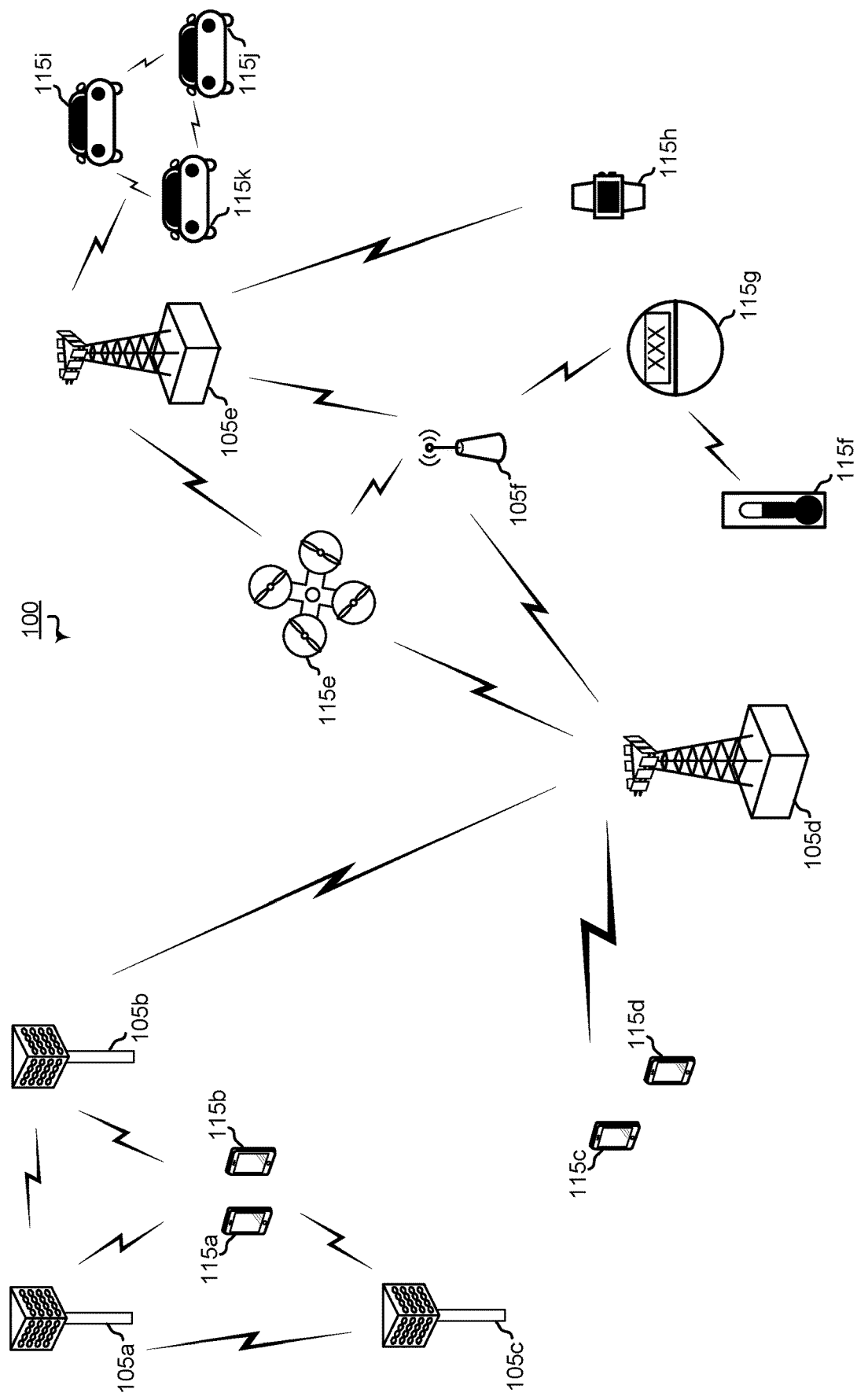
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Various aspects of the present disclosure relate to techniques that enable management of network-configured sensing bandwidths in a wireless communication system. In particular aspects of the present disclosure, a network may configure a sensing bandwidth, and the sensing bandwidth configuration may be signaled to a contending node. The contending node (e.g., a UE or a base station) may then perform a medium sensing procedure (e.g., an LBT procedure) using the configuration of the sensing bandwidth signaled to the UE. By providing techniques for configuring a sensing bandwidth at the network, and signaling the sensing bandwidth configuration to contending nodes, aspects of the present disclosure provide a more dynamic process that is better suited for those large variations in channel bandwidths, and which is better adapted to handle deployed channelization/numerology and heterogeneity in the frequency domain interference.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi- Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz—52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz—300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
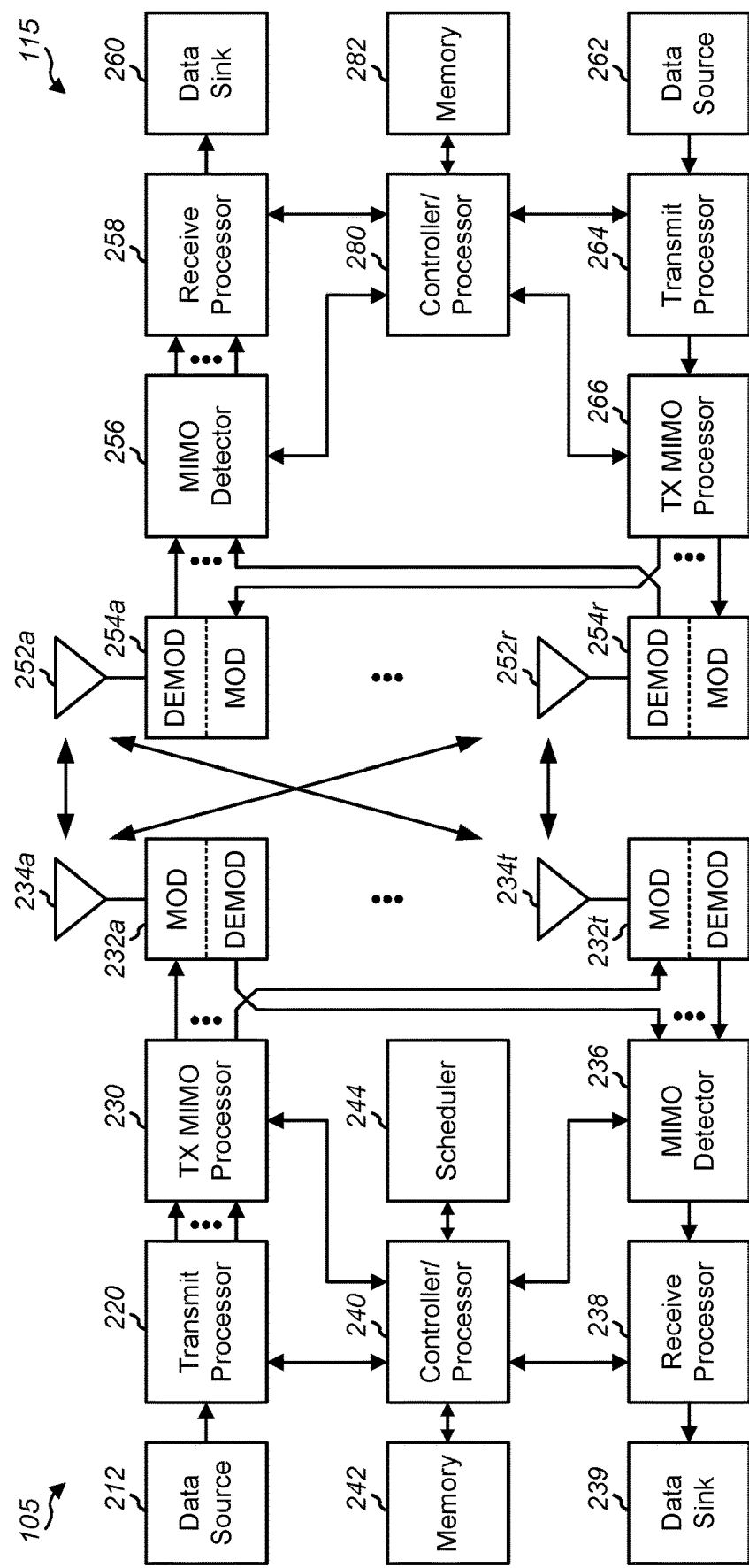
FIG. 2 is a block diagram illustrating a design of a base station and a UE configured according to one aspect of the present disclosure.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 3, 5, and 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In current implementations, determining whether a communication medium or channel is available in an unlicensed spectrum, a procedure that is sometimes referred to as medium or channel sensing, may include performing a procedure to detect an energy on the communication channel (e.g., a CCA) to determine the presence or absence of other signals on the channel in order to determine if the channel is occupied or clear. During a CCA, the energy detected on the channel may be compared to a threshold and, when the energy detected is less than the threshold, the communication channel may be deemed to be available or clear. Otherwise, when the energy detected is equal to or greater than the threshold, the communication channel may be deemed to be unavailable or occupied.

In a particular example, such as in a wireless communication system operating in accordance with a 5G NR network protocol such as that defined by the 3GPP, a contending node (e.g., a UE or a base station) may initiate an LBT operation (e.g., to determine whether a communication channel (e.g., a frequency spectrum within an unlicensed frequency spectrum) is available for access. In some implementations, the communication channel may be included in a mmWave frequency spectrum, such as a 52 gigahertz (GHz) to 71 GHz frequency spectrum, as an illustrative example. The 52 to 71 GHz frequency spectrum may be referred to as an FR2× frequency spectrum.

To determine whether the communication channel is available, the contending node may perform CCA procedure in which a scan of a sensing bandwidth, also referred to herein as a sensing window, (e.g., by detecting signals or interference within the sensing bandwidth and measuring energy of the signals or interference) is performed to determine an energy parameter associated with the sensing bandwidth. The sensing bandwidth may refer to the particular set or range of frequency resources over which the LBT procedure (e.g., the CCA) is to be performed. In implementations, a contending node may perform the LBT procedure (e.g., the CCA) over the sensing bandwidth to determine whether the communication channel is available or not.

Once the energy parameter is detected, the contending node may then compare the energy parameter to an energy detection threshold (EDT) to determine a result of the LBT operation. To illustrate, in some wireless communication protocols, the EDT may be expressed in decibel-milliwatts (dBm) and may be determined based on Equation 1:

$$EDT = -80dBm + 10*\log_{10}\left(\frac{Pmax}{Pout}\right) + 10*\log_{10}(BW). \quad \text{(Equation 1)}$$

In Equation 1, Pmax may indicate a maximum radio frequency (RF) transmission power associated with the contending node, Pout may indicate an RF transmission power used by the contending node (where Pout≤Pmax), and BW may indicate the bandwidth (e.g., in megahertz (MHz) of the particular communication channel.

In some examples, if the energy parameter fails to satisfy (e.g., is less than, or is less than or equal to) the EDT, then the communication channel may be deemed to be available or clear. In this case, the contending node may acquire at least a portion of the communication channel and may transmit one or more signals (such as an uplink or downlink transmission) during a channel occupancy time (COT) associated with the LBT operation. The contending node may transmit the transmission using the communication channel corresponding to the sensing bandwidth. In some other examples, if the energy parameter satisfies (e.g., is greater than, or is greater than or equal to) the EDT, then the communication channel may be deemed to be unavailable or occupied. In this case, the contending node may postpone the transmission (e.g., until performing another CCA scan having a result that indicates the communication channel is available).

However, as will be appreciated from the foregoing, performing the LBT procedure to determine whether the communication channel is available, requires first determining the sensing bandwidth. In some implementations, the sensing bandwidth over which the LBT sensing may be performed by a contending node (e.g., a base station or a UE) may be determined in different ways or by different alternatives. In one alternative, the sensing bandwidth may be determined to be the channel bandwidth or the bandwidth part (BWP) bandwidth assigned or configured for the node. For example, a node (e.g., a UE or base station) may be configured with a BWP bandwidth that may include a number of uplink and/or downlink BWPs, which may be active or inactive. In this case, the sensing bandwidth may be determined to be the BWP bandwidth configured for the node.

In another alternative, the sensing bandwidth over which the LBT sensing may be performed by a contending node (e.g., a base station or a UE) may be determined to be the transmission bandwidth. In this case, the transmission bandwidth may include the set of frequencies over which a transmission for which a contending node is contending is to occur. In this case, a contending node (e.g., a UE or base station) may be configured to perform the LBT sensing procedure (e.g., the CCA) over the transmission frequency.

In yet another alternative, the sensing bandwidth may be determined by defining an LBT unit, also referred to as an LBT subband, and dividing a channel bandwidth (or BWP bandwidth) into a number of LBT subbands. In this case, a contending node (e.g., a UE or base station) may be configured to perform the LBT sensing procedure (e.g., the CCA) over all the LBT subbands, within the communication channel bandwidth, over which the data transmission is to occur.

Although these alternatives provide different ways to configure the sensing bandwidth, some wireless network deployments are expected to include unlicensed spectrums with large variations in channel bandwidths. These large variations in channel bandwidths may include channel bandwidths ranging from 50 MHz or 100 MHz to 2.16 GHz or in some cases even higher.

Various aspects of the present disclosure relate to techniques that enable management of network-configured sensing bandwidths in a wireless communication system. In particular aspects of the present disclosure, a network may configure a sensing bandwidth, and the sensing bandwidth configuration may be signaled to a contending node. The contending node (e.g., a UE or a base station) may then perform a medium sensing procedure (e.g., an LBT procedure) using the configuration of the sensing bandwidth signaled to the UE. By providing techniques for configuring a sensing bandwidth at the network, and signaling the sensing bandwidth configuration to contending nodes, aspects of the present disclosure provide a more dynamic process that is better suited for those large variations in channel bandwidths, and which is better adapted to handle deployed channelization/numerology and heterogeneity in the frequency domain interference.

Figure 3:
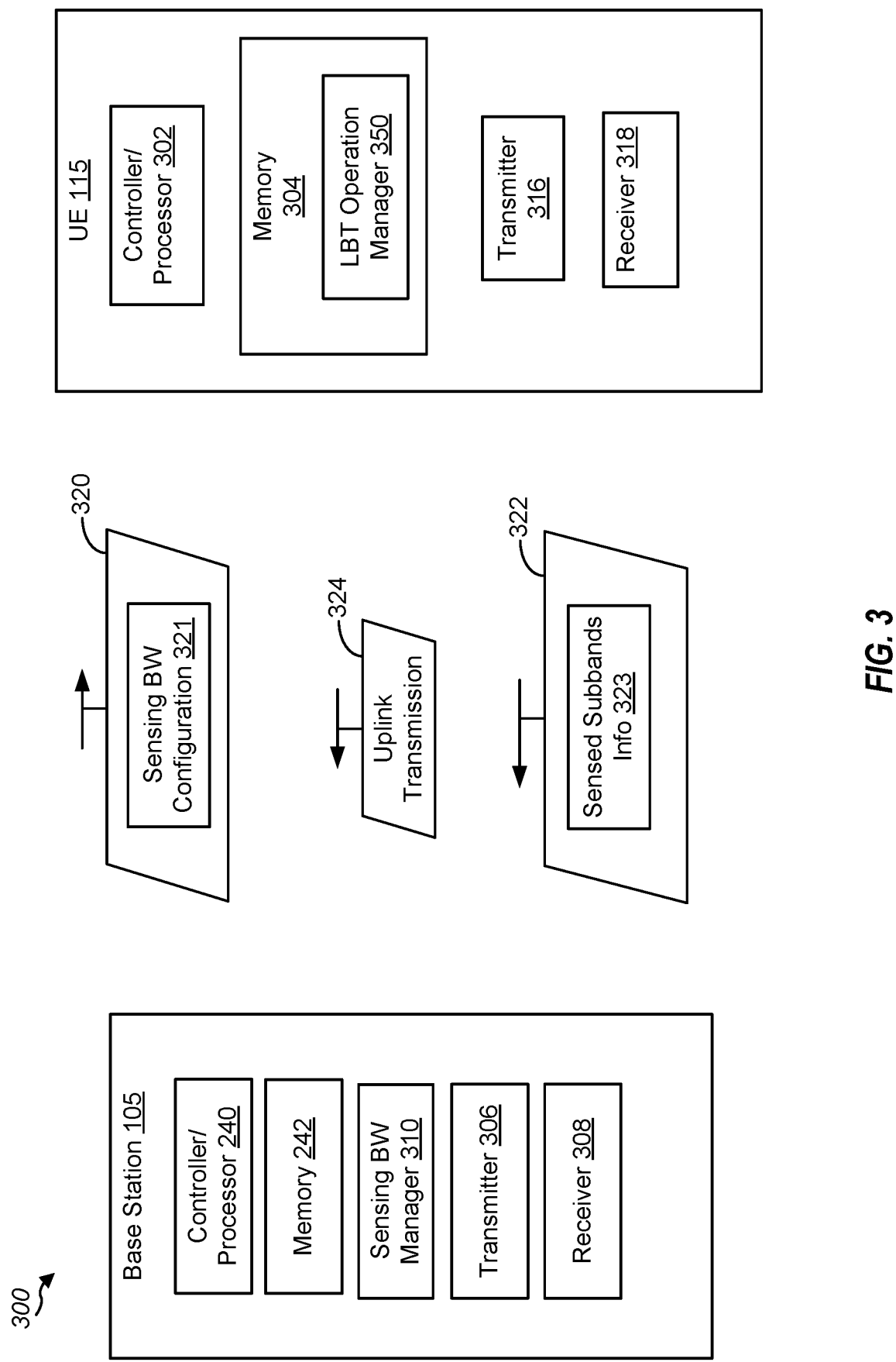
FIG. 3 is a block diagram illustrating an example of a wireless communication system according to some aspects of the disclosure.

FIG. 3 is a block diagram of an example wireless communications system 300 that supports management of network-configured sensing bandwidths according to one or more aspects. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store LBT operation manager 350. In aspects, LBT operation manager 350 may be configured to control, manage, or otherwise conduct operations to facilitate LBT operations (e.g., a CCA procedure or other medium sensing procedures) in accordance with aspects of the present disclosure.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store sensing bandwidth manager 310. In aspects, sensing bandwidth manager 310 may be configured to control, manage, or otherwise conduct operations to configure a sensing bandwidth for LBT operations in accordance with aspects of the present disclosure.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, a sensing bandwidth to be used for LBT operations, such as in accordance with the discussion above, may be configured by the network, and sensing bandwidth configuration 321 may be generated based on the configuration by the network. For example, in some aspects, sensing bandwidth configuration 321 may be determined or configured by base station 105. In some aspects, sensing bandwidth configuration 321 may be configured by another network entity, but may be signaled to base station 105, such as via a backhaul link.

In aspects, sensing bandwidth configuration 321 may define various aspects of the sensing bandwidth to be used by contending nodes. In some aspects, sensing bandwidth configuration 321 may define a bandwidth of the sensing window, which may indicate a number of LBT subbands into which the sensing bandwidth is divided. In some aspects, sensing bandwidth configuration 321 may define a size for each LBT subband. In some cases, the LBT subband size may be defined for all LBT subbands, or may be defined individually. In some cases, the LBT subband size may be defined for groups of LBT subbands.

It is noted that sensing bandwidth configuration 321 as described above is configured by the network dynamically. In these aspects, there may not be a definition of the sensing bandwidth configuration 321 in the applicable standard specifications that govern the definition of various aspects of wireless network 300's operation (e.g., 3GPP standards). For example, the LBT subband bandwidth may not be defined in the standard specifications. However, aspects of the present disclosure provide techniques for the LBT subband bandwidth to be configured by the network and signaled to contending nodes.

During operation, sensing bandwidth configuration 321 may be signaled to UE 115. In some aspects, sensing bandwidth configuration 321 may be signaled to UE 115 by a control node of wireless communication system 300, or may be signaled by base station 105. For example, base station 105 may transmit message 320 to UE 115. Message 320 may include sensing bandwidth configuration 321.

In aspects, message 320 may be a broadcast message, such as a system information block (SIB) message, a remaining minimum system information (RMSI) message, and/or other broadcast messages. The broadcast message carrying sensing bandwidth configuration 321 may be received by UE 115 (and/or may be received by other network nodes).

In aspects, the encoding of the sensing bandwidth configuration 321 into the broadcast message may be such that the LBT subband bandwidth signaled to a particular node in the sensing bandwidth configuration 321 may depend on the connection status of the particular node. For example, sensing bandwidth configuration 321 may be encoded into broadcast message 320 such that, when UE 115 receives and decodes message 320 and obtains sensing bandwidth configuration 321, the obtained LBT subband bandwidth depends on the connection status of UE 115.

In aspects, when UE 115 is in radio resource control (RRC) idle mode (e.g., while searching for a base station to connect to), the LBT subband bandwidth obtained by UE 115 from sensing bandwidth configuration 321 in message 320, which in this example may be a broadcast message, includes the initial uplink bandwidth part (UL BWP) with which UE 115 was configured. For example, a communication channel over which UE 115 is to transmit data, and for which UE 115 may contend, may be associated with at least one BWP configured for UE 115. In aspects, when a UE is not in RRC connected mode, such as when UE 115 is in RRC idle mode, the UE may be configured with an initial UL BWP for transmitting channel access messages over the communication channel. In these aspects, when UE 115 is in RRC idle mode, the broadcast message received may indicate to the UE 115 that the LBT subband bandwidth indicated in sensing bandwidth configuration 321 may include the initial UL BWP. As such, when contending for the communication channel in RRC idle mode, UE 115 may conduct the LBT procedure over a sensing bandwidth including an LBT subband bandwidth that includes the initial UL BWP.

In aspects, when UE 115 is in RRC connected mode, the LBT subband bandwidth obtained by UE 115 from sensing bandwidth configuration 321 in message 320, which in this example may be a broadcast message, is and LBT subband bandwidth specified relative to an active UL BWP and active downlink (DL) BWP with which UE 115 is configured. For example, after establishing communication with a serving base station, UE 115 may operate according to an RRC connected mode. In these aspects, UE 115 may be configured with at least one active UL BWP and at least one active DL BWP for communication between the serving base station and UE 115. In this case, the communication channel over which UE 115 is to transmit data, and for which UE 115 may contend, may be associated with the at least one active UL BWP and the at least one active DL BWP with which UE 115 is configured. In these aspects, when UE 115 is in RRC idle mode, the broadcast message 320 received by UE 115 may indicate to UE 115 that the LBT subband bandwidth indicated in sensing bandwidth configuration 321 is relative to the active UL BWP and the active DL BWP. In aspects, the LBT subband bandwidth may be specified as an offset and a size relative to either one or both of the active UL BWP and the active DL BWP.

In aspects, message 320 may be a UE-specific message. For example, message 320 may be an RRC message, a DL-medium access control (MAC) control element (CE) message, or a DL control information (DCI) message. In these aspects, message 320 may be transmitted to UE 115 specifically, and the message carrying sensing bandwidth configuration 321 may be received by UE 115, from which UE 115 may obtain the LBT subband bandwidth information.

During operation, UE 115 may receive sensing bandwidth configuration 321. In aspects, UE 115 may use the received sensing bandwidth configuration 321 (e.g., received from base station 105 in message 320) to determine a sensing bandwidth over which UE 115 is to perform the LBT procedure (e.g., a CCA procedure) to determine whether the communication channel is available for a subsequent data transmission. In particular, UE 115 may use sensing bandwidth configuration 321 to determine the LBT subband bandwidth and/or size. For example, UE 115 may decode message 320 to determine the LBT subband bandwidth and/or size as configured by the network and received in message 320. In aspects, UE 115 may perform the LBT procedure on one or more of the LBT subbands and may determine whether the communication channel is available for the data transmission based on the result.

During operation, UE 115 may perform the LBT procedure (e.g., the CCA) on one or more of the LBT subbands as specified in sensing bandwidth configuration 321, and may determine whether the communication channel is available for the data transmission based on the results of the LBT procedure in accordance with aspects of the present disclosure.

In some aspects, UE 115 may determine whether the communication channel is available based on aggregated LBT subband results. In these aspects, UE 115 may perform an energy detection procedure on groups of LBT subbands from the LBT subbands as defined in sensing bandwidth configuration 321. For example, the LBT subbands into which the communication channel may have been divided may be further divided into one or more groups of LBT subbands, and UE 115 may detect an energy on one or more of these groups of LBT subbands. In these cases, each group may include a plurality of LBT subbands. UE 115 may detect the energy of each LBT subband in a group, and may then obtain an aggregated detected energy for each group. In aspects, the aggregated detected energy for a group may include a sum of the energies detected for all LBT subbands in the group. In aspects, the aggregated detected energy for the group may be compared against the EDT threshold. When the aggregated detected energy for the group is less than the EDT threshold, the group of LBT subband may be determined to be available or clear. Otherwise, when the aggregated detected energy for the group is equal to or greater than the EDT threshold, the group of LBT subband may be determined to be unavailable or occupied. In aspects, this procedure may be applied to each group of LBT subbands that is included in the channel bandwidth. In some aspects, the entire channel bandwidth, e.g., all the LBT subbands in the channel bandwidth, may be part of a single group. In this case, all the LBT subbands in the channel bandwidths may be aggregated into a single energy detected result, which may then be compared against a single EDT threshold to determine whether the channel is available or not.

In some aspects, UE 115 may determine whether the communication channel is available based on separate LBT subband results. In these aspects, UE 115 may perform an energy detection procedure separately on each LBT subband into which the communication channel may have been divided, each LBT subband as defined in sensing bandwidth configuration 321. For example, UE 115 may separately detect an energy on each LBT subband of the of LBT subbands of the communication channel. UE 115 may then compare each individual energy detection result with a respective subband EDT to determine whether the respective individual LBT subband is clear or not. For example, UE 115 may detect the energy on a first LBT subband and may separately detect the energy on a second LBT subband. UE 115 may then compare the energy detection result for the first LBT subband with a first subband EDT to determine whether the first LBT subband is clear or not. UE 115 may determine that the first LBT subband is clear when the detected energy on the first subband is less than that the first subband EDT. Otherwise, UE 115 may determine that the first LBT subband is occupied when the detected energy on the first subband is greater than or equal to the first subband EDT. In a similar manner, UE 115 may compare the energy detection result for the second LBT subband with a second subband EDT to determine whether the second LBT subband is clear or not. UE 115 may determine that the second LBT subband is clear when the detected energy on the second subband is less than that the second subband EDT. Otherwise, UE 115 may determine that the second LBT subband is occupied when the detected energy on the second subband is greater than or equal to the second subband EDT.

In aspects, the subband EDT may be the same for all LBT subbands (e.g., the first subband EDT and the second subband EDT may be the same), or may be an individualized EDT for each subband, where the EDT for one subband is specific to that one subband.

In aspects of the separate LBT subband results technique, UE 115 may determine that a communication channel is clear or unoccupied when all LBT subbands of the communication channel are determined to be clear. In these aspects, if one LBT subband of the communication channel is determined to be occupied, then the communication channel is determined to be occupied. In some aspects of the separate LBT subband results technique, UE 115 may determine to transmit over the communication channel as long as the transmission bandwidth (e.g., the set of frequency resources over which the data transmission is to be transmitted) is contained within the LBT subbands determined to be clear. In these aspects, if the transmission bandwidth spans at least one LBT subband determined to be occupied, then UE 115 may determine to forego the data transmission over the transmission bandwidth.

During operation, after determining that the communication channel is available based on the LBT procedure, UE 115 may obtain a COT associated with the LBT operation and may perform data transmission during the COT over the transmission bandwidth. For example, UE 115 may transmit uplink transmission 324 to base station 105 during the acquired COT.

In some alternative or additional aspects, UE 115 may perform one or more operations based on the determination that the communication channel is clear, such as "sharing" access to the COT. For example, in some implementations, UE 115 may share the COT (or a portion of the COT) with another node to allow the other node to transmit during the COT. For example, UE 115 may transmit a COT sharing message 322 to base station 105 to enable base station 105 to perform transmissions (e.g., downlink transmission to UE 115 or another node) during the COT. In aspects, COT sharing message 322 may include information about the LBT subbands that were sensed by UE 115 during operations (e.g., sensed subbands information 323), which may include information obtained by UE 115 (e.g., whether specific LBT subbands are clear or not) and configuration information about the LBT subbands (e.g., information on sensing bandwidth configuration 321). In this manner, base station 105 may occupy one or more of the LBT subbands determined to be clear by UE 105.

In aspects, COT sharing message 322 may be transmitted to base station 105 during the acquired COT by UE 115. The sensed subbands information 323 may include various information about the LBT subbands. In some aspects, the information may include information about the sensing bandwidth, such as a starting frequency and/or a frequency range of the sensing bandwidth. In some aspects, the information may include a size of the LBT subbands, a starting frequency associated with the sensing bandwidth, and a number of LBT subbands. In this manner, base station 105 may determine the size and bandwidth of the sensing window associated with the COT. In addition, COT sharing message 322 may include an indication of which LBT subbands are clear and/or which LBT subbands are not clear (e.g., are occupied). In aspects, the indication of which LBT subbands of the sensing bandwidth are clear and/or occupied may be provided as a bitmap of the sensed LBT subbands with an bit-indication of indicating which LBT subbands are clear.

Figure 4:
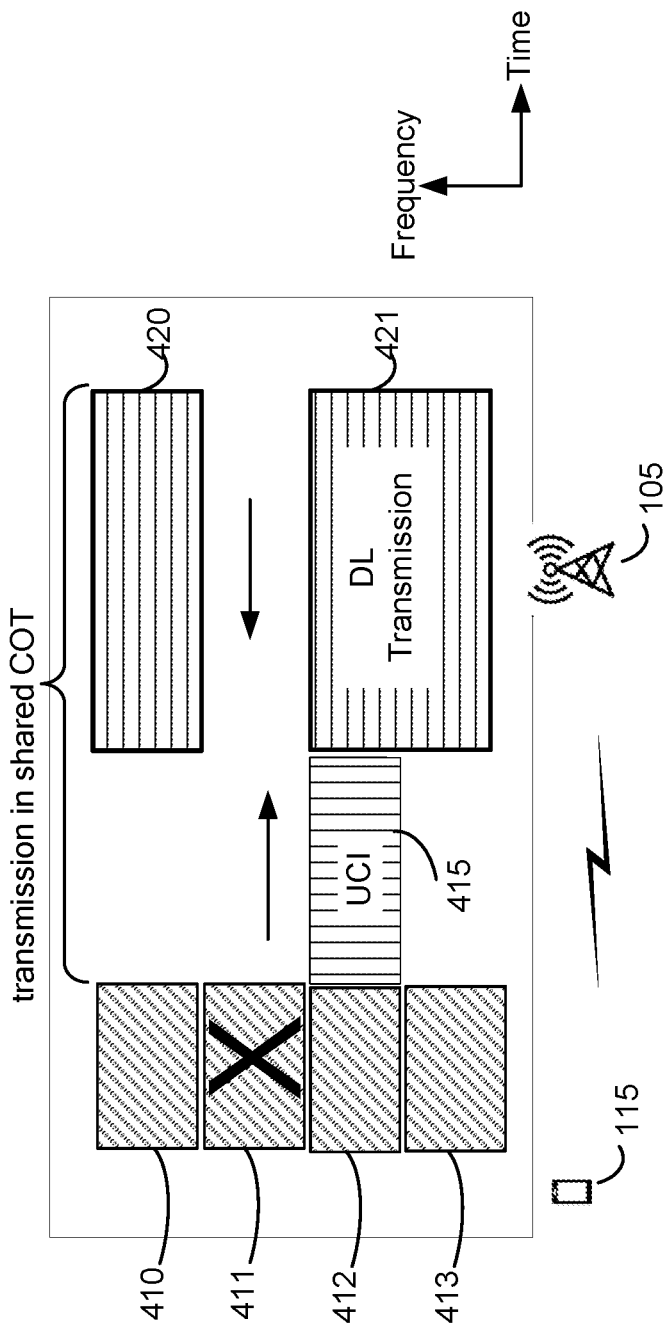
FIG. 4 illustrates an example of a channel occupancy time (COT)-sharing transmission scheme according to some aspects of the disclosure.

FIG. 4 illustrates an example of a COT sharing transmission scheme according to some aspects of the disclosure. As illustrated in the example of FIG. 4, UE 115 may perform an LBT procedure (e.g., CCA) on a sensing bandwidth that includes LBT subbands 410-413. The result of the LBT procedure may show that LBT subbands 410, 412, and 413 are clear, and LBT subband 411 is occupied. In this case, UE may determine to that the communication channel is available and may transmit a UCI to base station 105 over clear LBT subband 412. In this example, UE 115 may also transmit a COT sharing message to base station 105. For example, UE 115 may transmit a COT sharing message to base station 105 in UCI 415, or on a separate message, including information about the sensing bandwidth including LBT subbands 410-413. The information may include a starting frequency of the sensing bandwidth, the size of each LBT subband, and the number of LBT subbands (e.g., four LBT subbands).

After receiving the COT sharing message, base station 105 may determine a transmission bandwidth to transmit DL messages in the COT shared by UE 115. In aspects, the COT sharing message allows base station 105 to determine a transmission bandwidth that includes LBT subbands indicated as clear in the COT sharing message, and to avoid LBT subbands that are not clear. For example, base station 105 may determine to transmit DL transmission 421 and DL transmission 420 during the shared COT. As illustrated, base station 105 may determine to transmit DL transmission 421 in free LBT subband 413, and may determine to transmit DL transmission 420 in free LBT subband 410. As illustrated, base station 105 may not transmit in LBT subband 411, as LBT subband 411 has been indicated as an occupied LBT subband. As it will be appreciated, in some aspects, the UE providing information on sensed LBT subbands to other nodes in connection with COT sharing may improve efficiency of resource allocation within the wireless communication system 300.

Figure 7:
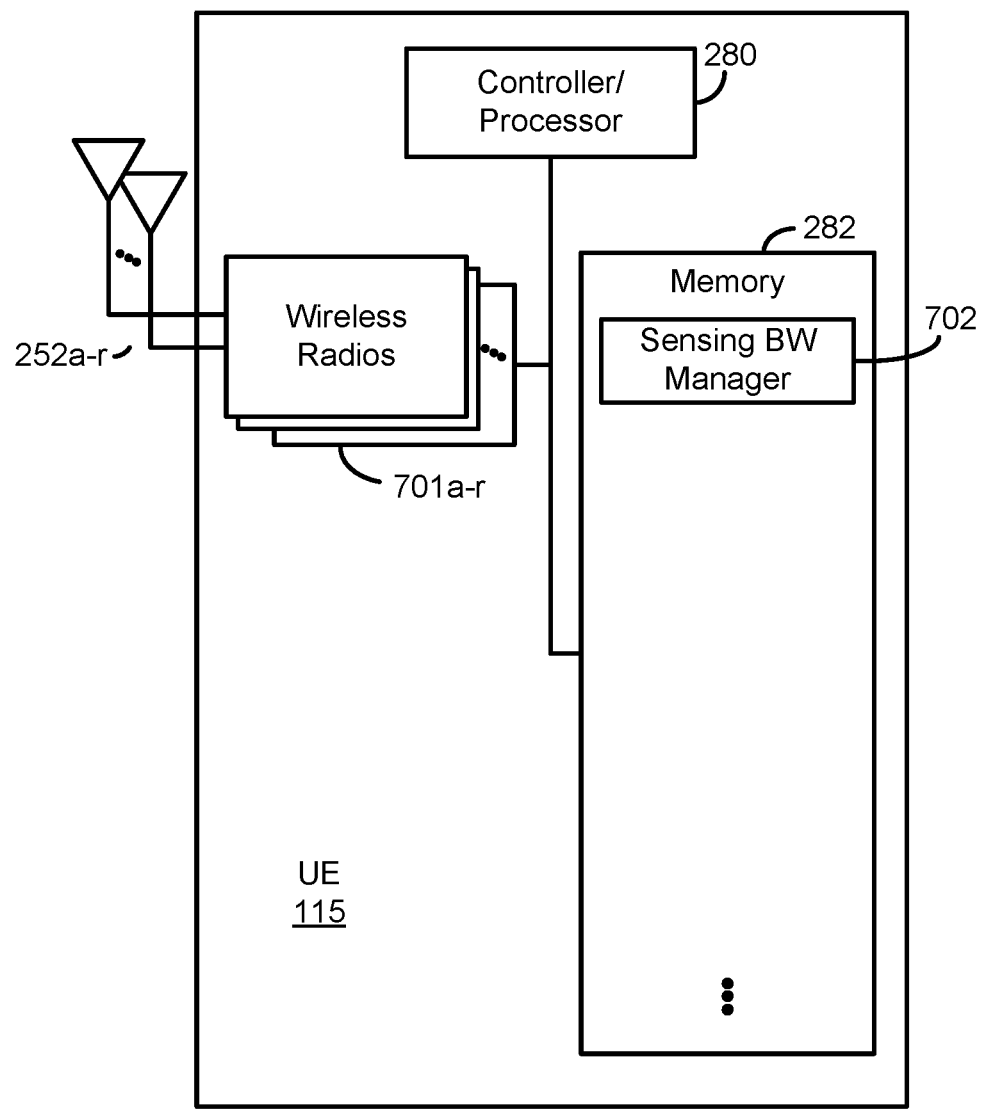
FIG. 7 is a block diagram illustrating an example of a UE according to some aspects of the disclosure.

FIG. 5 is a flow diagram illustrating an example process that supports management of network-configured sensing bandwidths in a wireless communication system according to one or more aspects. Operations of the process illustrated in FIG. 5 may be performed by a UE, such as UE 115 described above with reference to FIGS. 1, 2, 3, or a UE described with reference to FIG. 7. For example, example operations (also referred to as "blocks") of the process illustrated in FIG. 5 may enable UE 115 to support management of network-configured sensing bandwidths. FIG. 7 is a block diagram illustrating UE 115 configured according to aspects of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 700*a-r* and antennas 252*a-r*. Wireless radios 700*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 500, a UE receives a configuration for an LBT sensing window or bandwidth over which the UE is to perform a CCA procedure to determine whether a channel in an unlicensed spectrum is available for a data transmission over a transmission bandwidth. For example, UE 115, engaged in communications with a base station, may receive signals, e.g., via antennas 252*a-r* and wireless radios 701*a-r*, that include a configuration for an LBT sensing window over which UE 115 is to perform a CCA procedure to determine whether a channel in an unlicensed spectrum is available for a data transmission over a transmission bandwidth. In aspects, the configuration of the sensing window may define one or more of a bandwidth of the LBT sensing window, and a size for each of a plurality of LBT subbands of the LBT sensing window.

In aspects, receiving the configuration for the LBT sensing window includes receiving the configuration for the LBT sensing window from a base station in a broadcast message. In aspects, when the UE (e.g., UE 115) is in an RRC idle mode, the configuration for the LBT sensing window may indicate that the bandwidth of the LBT sensing window includes an initial UL BWP. In some aspects, when the UE (e.g., UE 115) is in an RRC connected mode, the configuration for the LBT sensing window may indicate that the bandwidth of the LBT sensing window is defined relative to an active UL BWP and active DL BWP of the UE.

In aspects, the UE may receive the configuration for the LBT sensing window in a UE-specific message, such as an RRC message, a DL MAC-CE message, or a DCI message.

At block 501, the UE (e.g., UE 115), performs the CCA procedure on at least one LBT subband of the plurality of LBT subbands of the LBT sensing window. In order to implement the functionality for such operations, UE 115, under control of controller/processor 280, executes sensing bandwidth manager 702, stored in memory 282. The functionality implemented through the execution environment of sensing bandwidth manager 702 allows for UE 115 to perform LBT operations according to the various aspects herein.

In aspects, performing the CCA procedure on at least one LBT subband of the plurality of LBT subbands may include detecting an energy on each LBT subband of the plurality of LBT subbands, adding together the energy detected on each LBT subband of the plurality of LBT subbands to generate a total energy detected, and then comparing the total energy detected to an EDT. In aspects, when the total energy detected on the aggregated LBT subbands is less than the EDT, the channel may be deemed to be available or clear. Otherwise, when the total energy detected on the aggregated LBT subbands is greater than or equal to the EDT, the channel may be deemed to be unavailable or occupied.

In aspects, performing the CCA procedure on at least one LBT subband of the plurality of LBT subbands may include detecting an energy on each LBT subband of the plurality of LBT subbands separately, and then comparing each of the energies on the LBT subbands to a respective subband EDT separately for each LBT subband. In aspects, the channel in the unlicensed spectrum may be deemed available or clear for the data transmission when the energy detected on each LBT subband is less than the respective subband EDT. Otherwise, when the energy detected on one or more LBT subbands is equal to or greater than its respective subband EDTs, the channel in the unlicensed spectrum may be deemed unavailable or occupied.

In some aspects, determining that the channel in the unlicensed spectrum is available or clear for the data transmission may include determining that the energy detected on one or more LBT subbands is less than the respective subband EDTs, which may indicate that the one or more LBT subbands are clear, and also determining that the transmission bandwidth over which the data is to be transmitted is contained within the span of the clear LBT subbands. In other words, the UE may use the channel for transmitting the data when the transmission bandwidth is contained within the clear LBT subbands.

At block 502, the UE (e.g., UE 115) determines, based on performing the CCA procedure on the at least one LBT subband of the plurality of LBT subbands of the LBT sensing window, that the channel in the unlicensed spectrum is available for the data transmission over the transmission bandwidth. In order to implement the functionality for such operations, UE 115, under control of controller/processor 280, executes sensing bandwidth manager 702, stored in memory 282. The functionality implemented through the execution environment of sensing bandwidth manager 702 allows for UE 115 to perform CCA procedures according to the various aspects herein. At block 503, the UE (e.g., UE 115) transmits the data over the transmission bandwidth. For example, UE 115, may transmit signals, e.g., via antennas 252*a-r* and wireless radios 701*a-r*, that include the data transmission over the transmission bandwidth.

In aspects, the UE 115, after determining that the channel is clear, may obtain COT for the available channel. In some aspects, the UE 115 may send, to a base station, an indication that UE 115 has initiated a procedure to share the COT with the base station. In aspects, the indication that the UE has initiated COT-sharing may include an indication of LBT subbands that have been determined to be clear by the UE based on performing the CCA procedure on the at least one LBT subband. In aspects, the indication of which LBT subbands of the of the plurality of LBT subbands are determined to be clear includes a starting frequency of the LBT sensing window bandwidth, an ending frequency of the LBT sensing window bandwidth, a size of the LBT sensing window bandwidth, a size of each LBT subband of the plurality of LBT subbands, and/or a bitmap of sensed LBT subbands indicating which LBT subbands are clear and which LBT subbands are not clear based on the CCA procedure.

Figure 8:
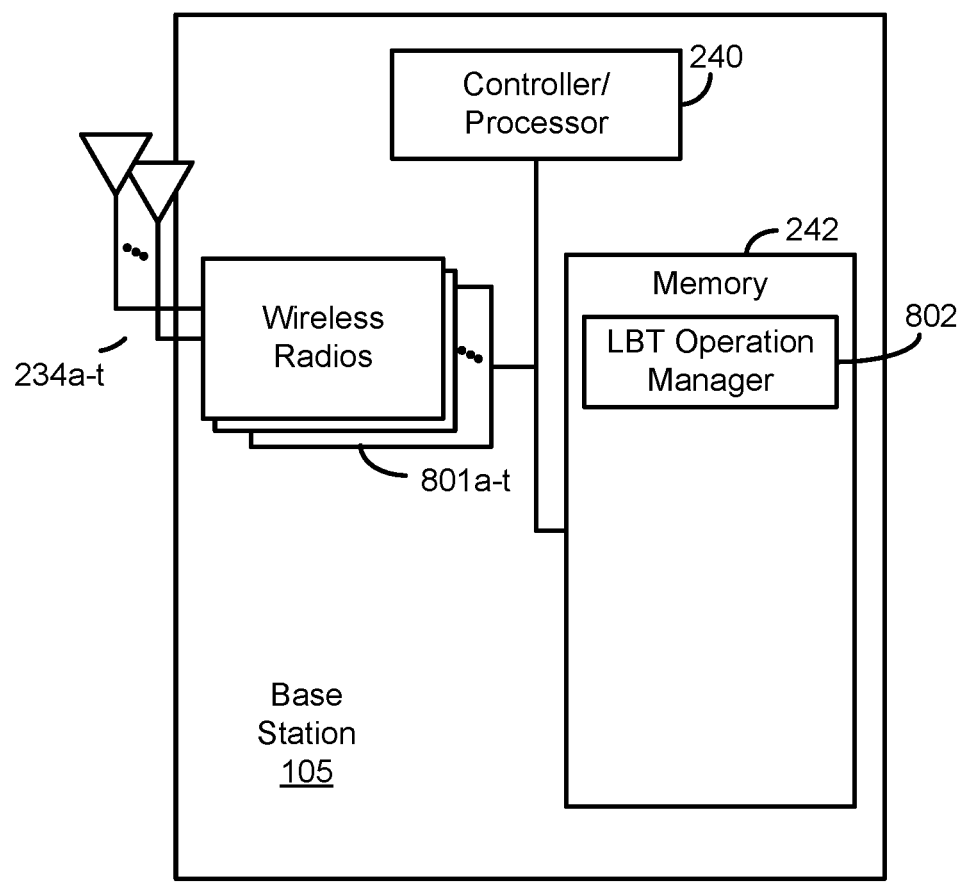
FIG. 8 is a block diagram illustrating an example of a base station according to some aspects of the disclosure.

FIG. 6 is a block diagram illustrating example blocks executed to implement one aspect of the present disclosure. Operations of the process illustrated in FIG. 5 may be performed by a base station, such as base station 105 described above with reference to FIGS. 1, 2, 3, or a base station described with reference to FIG. 8. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 801*a-t* and antennas 234*a-t*. Wireless radios 801*a-t* includes various components and hardware, as illustrated in FIG. 2 for base station 105, including modulator/demodulators 232a-t, MIMO detector 236, receive processor 238, transmit processor 220, and TX MIMO processor 230.

At block 600, a base station (e.g., base station 102) generates a configuration for an LBT sensing window over which a UE is to perform a CCA procedure to determine whether a channel in an unlicensed spectrum is available for a data transmission over a transmission bandwidth. In order to implement the functionality for such operations, base station 105, under control of controller/processor 240, executes LBT operation manager 802, stored in memory 242. The functionality implemented through the execution environment of LBT operation manager 802 allows for base station 105 to perform LBT sensing window operations according to the various aspects herein. In aspects, the configuration of the sensing window may define one or more of a bandwidth of the LBT sensing window, and a size for each of a plurality of LBT subbands of the LBT sensing window.

At block 601, the base station transmits the configuration of the sensing bandwidth to the UE. For example, the base station (e.g., base station 105) engaged in communications with the UE, may transmit the configuration of the sensing bandwidth to the UE via antennas 234a-t and wireless radios 801a-t.

In aspects, base station 105 may transmit the configuration for the LBT sensing window in a broadcast message. In aspects, the configuration for the LBT sensing window may be configured such that, when the UE (e.g., UE 115) is in an RRC idle mode, the configuration for the LBT sensing window may indicate that the bandwidth of the LBT sensing window includes an initial UL BWP of the UE. In some aspects, the configuration for the LBT sensing window may be configured such that, when the UE (e.g., UE 115) is in an RRC connected mode, the configuration for the LBT sensing window may indicate that the bandwidth of the LBT sensing window is defined relative to an active UL BWP and active DL BWP of the UE.

In aspects, base station 105 may transmit the configuration for the LBT sensing window in a UE-specific message, such as an RRC message, a DL MAC-CE message, or a DCI message.

In aspects, base station 105 may receive from the UE an indication that the UE has initiated a procedure to share a COT obtained by the UE with the base station. In aspects, the indication that the UE has initiated COT-sharing may include an indication of LBT subbands that have been determined to be clear by the UE based on performing the CCA procedure on the at least one LBT subband. In aspects, the indication of which LBT subbands of the of the plurality of LBT subbands are determined to be clear includes a starting frequency of the LBT sensing window bandwidth, an ending frequency of the LBT sensing window bandwidth, a size of the LBT sensing window bandwidth, a size of each LBT subband of the plurality of LBT subbands, and/or a bitmap of sensed LBT subbands indicating which LBT subbands are clear and which LBT subbands are not clear based on the CCA procedure.

In aspects, the base station may use the COT-sharing information received from the UE to transmit data during the COT based on the COT-sharing information. For example, the base station may transmit during the COT in an LBT subband that has been indicated as clear by the UE, but the base station may not transmit, or may refrain or forego transmitting, during the COT in an LBT subband that has been indicated as occupied (or not clear) by the UE.

In one or more aspects, techniques for supporting management of network-configured sensing bandwidths in a wireless communication system according to one or more aspects may include additional aspects, such as any single aspect or any combination of aspects described below or in connection with one or more other processes or devices described elsewhere herein. In a first aspect, supporting management of network-configured sensing bandwidths in a wireless communication system may include an apparatus configured to receive a configuration for an LBT sensing window over which the UE is to perform a CCA procedure to determine whether a channel in an unlicensed spectrum is available for a data transmission over a transmission bandwidth. In the first aspect, the configuration defines one or more of a bandwidth of the LBT sensing window, and a size for each of a plurality of LBT subbands of the LBT sensing window. The apparatus is further configured to perform the CCA procedure on at least one LBT subband of the plurality of LBT subbands of the LBT sensing window, to determine, based on performing the CCA procedure on the at least one LBT subband of the plurality of LBT subbands of the LBT sensing window, that the channel in the unlicensed spectrum is available for the data transmission over the transmission bandwidth, and to transmit the data over the transmission bandwidth. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, performing the CCA procedure on at least one LBT subband of the plurality of LBT subbands includes detecting an energy on each LBT subband of the plurality of LBT subbands.

In a third aspect, alone or in combination with one or more of the first aspect or the second aspect, performing the CCA procedure on at least one LBT subband of the plurality of LBT subbands includes adding together the energy detected on each LBT subband of the plurality of LBT subbands to generate a total energy detected.

In a fourth aspect, alone or in combination with one or more of the first aspect through the third aspect, performing the CCA procedure on at least one LBT subband of the plurality of LBT subbands includes comparing the total energy detected to an EDT.

In a fifth aspect, alone or in combination with one or more of the first aspect through the fourth aspect, determining that the channel in the unlicensed spectrum is available for the data transmission includes determining that the total energy detected is less than the EDT.

In a sixth aspect, alone or in combination with one or more of the first aspect through the fifth aspect, performing the CCA procedure on at least one LBT subband of the plurality of LBT subbands includes detecting an energy on each LBT subband of the plurality of LBT subbands.

In a seventh aspect, alone or in combination with the sixth aspect, performing the CCA procedure on at least one LBT subband of the plurality of LBT subbands includes comparing the energy detected on each LBT subband to a respective subband EDT.

In an eighth aspect, alone or in combination with one or more of the sixth aspect through the seventh aspect, determining that the channel in the unlicensed spectrum is available for the data transmission includes determining that the energy detected on each LBT subband is less than the respective subband EDT.

In a ninth aspect, alone or in combination with one or more of the first aspect through the eighth aspect, the techniques in the first aspect also include determining that the channel in the unlicensed spectrum is not available for the data transmission when the energy detected on one or more LBT subbands is equal to or greater than the respective subband EDTs.

In a tenth aspect, alone or in combination with one or more of the first aspect through the ninth aspect, determining that the channel in the unlicensed spectrum is available for the data transmission includes determining that the energy detected on one or more LBT subbands is less than the respective subband EDTs, thereby indicating that the one or more LBT subbands are clear.

In an eleventh aspect, alone or in combination with one or more of the first aspect through the tenth aspect, determining that the channel in the unlicensed spectrum is available for the data transmission includes determining that the transmission bandwidth over which the data is to be transmitted is within a span of the one or more clear LBT subbands.

In a twelfth aspect, alone or in combination with one or more of the first aspect through the eleventh aspect, receiving the configuration for the LBT sensing window includes receiving the configuration for the LBT sensing window from a base station in a broadcast message, and the configuration for the LBT sensing window indicates that the bandwidth of the LBT sensing window includes an initial UL BWP.

In a thirteenth aspect, alone or in combination with the twelfth aspect, the configuration for the LBT sensing window indicates that the bandwidth of the LBT sensing window is defined relative to an active UL BWP and/or a DL BWP of the UE.

In a fourteenth aspect, alone or in combination with one or more of the first aspect through the thirteenth aspect, receiving the configuration for the LBT sensing window includes receiving the configuration for the LBT sensing window from a base station in a UE-specific message, and the UE-specific message includes an RRC message, a DL MAC-CE, or a DCI message.

In a fifteenth aspect, alone or in combination with one or more of the first aspect through the fourteenth aspect, the techniques in the first aspect also include obtaining a COT for the available channel.

In a sixteenth aspect, alone or in combination with the fifteenth aspect, the techniques in the first aspect also include sending, to a base station, an indication of LBT subbands of the of the plurality of LBT subbands that are determined to be clear based on performing the CCA procedure on the at least one LBT subband.

In a seventeenth aspect, alone or in combination with one or more of the fifteenth aspect through the sixteenth aspect, the indication of LBT subbands of the of the plurality of LBT subbands that are determined to be clear includes one or more of a starting frequency of the LBT sensing window bandwidth, an ending frequency of the LBT sensing window bandwidth, a size of the LBT sensing window bandwidth, a size of each LBT subband of the plurality of LBT subbands, or a bitmap of sensed LBT subbands indicating which LBT subbands are clear and which LBT subbands are not clear based on the CCA procedure.

In an eighteenth aspect, supporting management of network-configured sensing bandwidths in a wireless communication system may include an apparatus configured to generate a configuration for an LBT sensing window over which a UE is to perform a CCA procedure to determine whether a channel in an unlicensed spectrum is available for a data transmission over a transmission bandwidth. In the eighteenth aspect, the configuration defines one or more of a bandwidth of the LBT sensing window, and a size for each of a plurality of LBT subbands of the LBT sensing window. The apparatus is further configured to transmit the configuration for the LBT sensing window to the UE. In the eighteenth aspect, the UE determines, based on performing the CCA procedure on at least one LBT subband of the plurality of LBT subbands of the LBT sensing window, that the channel in the unlicensed spectrum is available for the data transmission over the transmission bandwidth. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a nineteenth aspect, alone or in combination with the eighteenth aspect, the techniques in the eighteenth aspect receiving, from the UE, the data transmission over the transmission bandwidth within the channel.

In a twentieth aspect, alone or in combination with one or more of the eighteenth aspect through the nineteenth aspect, the UE performs the CCA procedure on at least one LBT subband of the plurality of LBT subbands by detecting an energy on each LBT subband of the plurality of LBT subbands, adding together the energy detected on each LBT subband of the plurality of LBT subbands to generate a total energy detected, comparing the total energy detected to an EDT, and determining that the channel in the unlicensed spectrum is available for the data transmission when the total energy detected is less than the EDT.

In a twenty-first aspect, alone or in combination with one or more of the eighteenth aspect through the twentieth aspect, the UE performs the CCA procedure on at least one LBT subband of the plurality of LBT subbands by detecting an energy on each LBT subband of the plurality of LBT subbands, comparing the energy detected on each LBT subband to a respective subband EDT, and determining that the channel in the unlicensed spectrum is available for the data transmission when the energy detected on each LBT subband is less than the respective subband EDT.

In a twenty-second aspect, alone or in combination with one or more of the eighteenth aspect through the twenty-first aspect, transmitting the configuration for the LBT sensing window to the UE includes transmitting the configuration for the LBT sensing window to the UE in a broadcast message, and the configuration for the LBT sensing window indicates that the bandwidth of the LBT sensing window includes an UL BWP configured for the UE.

In a twenty-third aspect, alone or in combination with the twenty-second aspect, the configuration for the LBT sensing window indicates that the bandwidth of the LBT sensing window is defined relative to an active UL BWP and an active DL BWP of the UE.

In a twenty-fourth aspect, alone or in combination with one or more of the eighteenth aspect through the twenty-third aspect, transmitting the configuration for the LBT sensing window to the UE includes transmitting the configuration for the LBT sensing window to the UE in a UE-specific message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3, 5, and/or 6 may comprise processors, electronics devices, hardware devices, electronics components, logical circuits, memories, software codes, firmware codes, etc., or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, by a user equipment (UE), a message including a sensing bandwidth configuration for a listen-before-talk (LBT) sensing window over which the UE is to perform a clear channel assessment (CCA) procedure to determine whether a channel in an unlicensed spectrum is available for a data transmission over a transmission bandwidth, wherein the sensing bandwidth configuration for the LBT sensing window is generated by a network entity for the LBT sensing window based on a sensing bandwidth configured by the network entity and specifies a plurality of LBT subbands of the LBT sensing window for the CCA procedure, and wherein the sensing bandwidth configuration defines one or more of: a bandwidth of a LBT subband of the plurality of LBT subbands of the LBT sensing window, and a size for each of a plurality of LBT subbands of the plurality of LBT subbands of the LBT sensing window;
performing the CCA procedure on at least one LBT subband of the plurality of LBT subbands of the LBT sensing window;
determining, based on performing the CCA procedure on the at least one LBT subband of the plurality of LBT subbands of the LBT sensing window, that the channel in the unlicensed spectrum is available for the data transmission over the transmission bandwidth; and
transmitting data of the data transmission over the transmission bandwidth.

2. The method of claim 1, wherein performing the CCA procedure on at least one LBT subband of the plurality of LBT subbands of the LBT sensing window includes:
detecting an energy on each LBT subband of the plurality of LBT subbands of the LBT sensing window;
adding together the energy detected on each LBT subband of the plurality of LBT subbands of the LBT sensing window to generate a total energy detected; and
comparing the total energy detected to an energy detected threshold (EDT), and wherein determining that the channel in the unlicensed spectrum is available for the data transmission includes determining that the total energy detected is less than the EDT.

3. The method of claim 1, wherein performing the CCA procedure on at least one LBT subband of the plurality of LBT subbands of the LBT sensing window includes:
detecting an energy on each LBT subband of the plurality of LBT subbands of the LBT sensing window; and
comparing the energy detected on each LBT subband to a respective subband energy detected threshold (EDT).

4. The method of claim 3, wherein determining that the channel in the unlicensed spectrum is available for the data transmission includes:
determining that the energy detected on each LBT subband is less than the respective subband EDT.

5. The method of claim 3, further comprising:
determining that the channel in the unlicensed spectrum is not available for the data transmission when the energy detected on one or more LBT subbands is equal to or greater than the respective subband EDTs.

6. The method of claim 3, wherein determining that the channel in the unlicensed spectrum is available for the data transmission includes:
determining that the energy detected on one or more LBT subbands is less than the respective subband EDTs, thereby indicating that the one or more LBT subbands are clear; and
determining that the transmission bandwidth over which the data is to be transmitted is within a span of the one or more LBT subbands determined to be clear.

7. The method of claim 1, wherein receiving the message including the sensing bandwidth configuration for the LBT sensing window includes receiving the message including the sensing bandwidth configuration from a base station in a broadcast message, wherein the sensing bandwidth configuration for the LBT sensing window indicates one of:
that the bandwidth of the LBT sensing window includes an initial uplink (UL) bandwidth part (BWP) when the UE is in a radio resource control (RRC) idle mode; and
that the bandwidth of the LBT sensing window is defined relative to an active UL and downlink (DL) BWP of the UE when the UE is in a RRC connected mode.

8. The method of claim 1, wherein receiving the message including the sensing bandwidth configuration for the LBT sensing window includes receiving the message including the sensing bandwidth configuration for the LBT sensing window from a base station in a UE-specific message, wherein the UE-specific message includes one or more of:
a radio resource control (RRC) message;
a downlink (DL) medium access control (MAC) control element (CE) message; and
a DL control information (DCI) message.

9. The method of claim 1, further comprising:
obtaining a channel occupancy time (COT) for the channel determined to be available for the data transmission; and
sending, to a base station, a COT sharing message including an indication of LBT subbands of the of the plurality of LBT subbands of the LBT sensing window that are determined to be clear based on performing the CCA procedure on the at least one LBT subband.

10. The method of claim 9, wherein the indication of LBT subbands of the of the plurality of LBT subbands of the LBT sensing window that are determined to be clear includes one or more of:
a starting frequency of the LBT sensing window bandwidth;
an ending frequency of the LBT sensing window bandwidth;
a size of the LBT sensing window bandwidth;
a size of each LBT subband of the plurality of LBT subbands of the LBT sensing window; and
a bitmap of sensed LBT subbands indicating which LBT subbands are clear and which LBT subbands are not clear based on the CCA procedure.

11. A method of wireless communication, comprising:
configuring, by a base station, a sensing bandwidth for a listen-before-talk (LBT) sensing window;
generating, by the base station, a sensing bandwidth configuration for the LBT sensing window based on the sensing bandwidth, wherein the sensing bandwidth configuration specifies a plurality of LBT subbands of the LBT sensing window over which a user equipment (UE) is to perform a clear channel assessment (CCA) procedure to determine whether a channel in an unlicensed spectrum is available for a data transmission over a transmission bandwidth, wherein the sensing bandwidth configuration defines one or more of: a bandwidth of a LBT subband of the plurality of LBT subbands of the LBT sensing window, and a size for each of a plurality of LBT subbands of the plurality of LBT subbands of the LBT sensing window; and transmitting a message including the sensing bandwidth configuration for the LBT sensing window to the UE for the CCA procedure, wherein the UE determines, based on performing the CCA procedure on at least one LBT subband of the plurality of LBT subbands of the LBT sensing window, that the channel in the unlicensed spectrum is available for the data transmission over the transmission bandwidth.

12. The method of claim 11, further comprising:
receiving, from the UE, data of the data transmission over the transmission bandwidth within the channel.

13. The method of claim 11, wherein the UE performs the CCA procedure on at least one LBT subband of the plurality of LBT subbands of the LBT sensing window by:
detecting an energy on each LBT subband of the plurality of LBT subbands of the LBT sensing window;
adding together the energy detected on each LBT subband of the plurality of LBT subbands of the LBT sensing window to generate a total energy detected; and
comparing the total energy detected to an energy detected threshold (EDT), and determining that the channel in the unlicensed spectrum is available for the data transmission when the total energy detected is less than the EDT.

14. The method of claim 11, wherein the UE performs the CCA procedure on at least one LBT subband of the plurality of LBT subbands of the LBT sensing window by:
detecting an energy on each LBT subband of the plurality of LBT subbands of the LBT sensing window;
comparing the energy detected on each LBT subband to a respective subband energy detected threshold (EDT); and
determining that the channel in the unlicensed spectrum is available for the data transmission when the energy detected on each LBT subband is less than the respective subband EDT.

15. The method of claim 11, wherein transmitting the message including the sensing bandwidth configuration for the LBT sensing window to the UE includes transmitting the message including the sensing bandwidth configuration for the LBT sensing window to the UE in a broadcast message, wherein the message including the sensing bandwidth configuration for the LBT sensing window indicates one of:
that the bandwidth of the LBT sensing window includes an initial uplink (UL) bandwidth part (BWP) configured for the UE when the UE is in a radio resource control (RRC) idle mode; and
that the bandwidth of the LBT sensing window is defined relative to an active UL and downlink (DL) BWP of the UE when the UE is in a RRC connected mode.

16. The method of claim 11, wherein transmitting the message including the sensing bandwidth configuration for the LBT sensing window to the UE includes transmitting the message including the sensing bandwidth configuration for the LBT sensing window to the UE in a UE-specific message, wherein the UE-specific message includes one or more of:

a radio resource control (RRC) message;
a downlink (DL) medium access control (MAC) control element (CE) message; and
a DL control information (DCI) message.

17. The method of claim 11, further comprising:
receiving, from the UE, a channel occupancy time (COT) sharing message including an indication that the UE has initiated a COT-sharing procedure to share a COT obtain based on the CCA procedure with the base station, wherein the indication that that the UE has initiated a COT-sharing procedure includes an indication of LBT subbands of the of the plurality of LBT subbands of the LBT sensing window that are determined to be clear by the UE based on performing the CCA procedure on the at least one LBT subband.

18. The method of claim 17, wherein the indication of LBT subbands of the of the plurality of LBT subbands of the LBT sensing window that are determined to be clear includes one or more of:
a starting frequency of the LBT sensing window bandwidth;
an ending frequency of the LBT sensing window bandwidth;
a size of the LBT sensing window bandwidth;
a size of each LBT subband of the plurality of LBT subbands of the LBT sensing window; and
a bitmap of sensed LBT subbands indicating which LBT subbands are clear and which LBT subbands are not clear based on the CCA procedure.

19. An apparatus configured for wireless communication, comprising:
means for receiving, by a user equipment (UE), a message including a sensing bandwidth a configuration for a listen-before-talk (LBT) sensing window over which the UE is to perform a clear channel assessment (CCA) procedure to determine whether a channel in an unlicensed spectrum is available for a data transmission over a transmission bandwidth, wherein the sensing bandwidth configuration for the LBT sensing window is generated by a network entity for the LBT sensing window based on a sensing bandwidth configured by the network entity and specifies a plurality of LBT subbands of the LBT sensing window for the CCA procedure, and wherein the sensing bandwidth configuration defines one or more of: a bandwidth of a LBT subband of the plurality of LBT subbands of the LBT sensing window, and a size for each of a plurality of LBT subbands of the plurality of LBT subbands of the LBT sensing window;
means for performing the CCA procedure on at least one LBT subband of the plurality of LBT subbands of the LBT sensing window;
means for determining, based on performing the CCA procedure on the at least one LBT subband of the plurality of LBT subbands of the LBT sensing window, that the channel in the unlicensed spectrum is available for the data transmission over the transmission bandwidth; and
means for transmitting data of the data transmission over the transmission bandwidth.

20. The apparatus of claim 19, wherein the means for performing the CCA procedure on at least one LBT subband of the plurality of LBT subbands of the LBT sensing window include:
means for detecting an energy on each LBT subband of the plurality of LBT subbands of the LBT sensing window;

means for adding together the energy detected on each LBT subband of the plurality of LBT subbands of the LBT sensing window to generate a total energy detected; and means for comparing the total energy detected to an energy detected threshold (EDT), and wherein the means for determining that the channel in the unlicensed spectrum is available for the data transmission include means for determining that the total energy detected is less than the EDT.

21. The apparatus of claim 19, wherein the means for performing the CCA procedure on at least one LBT subband of the plurality of LBT subbands of the LBT sensing window include:
means for detecting an energy on each LBT subband of the plurality of LBT subbands of the LBT sensing window; and
means for comparing the energy detected on each LBT subband to a respective subband energy detected threshold (EDT).

22. The apparatus of claim 21, wherein the means for determining that the channel in the unlicensed spectrum is available for the data transmission include:
means for determining that the energy detected on each LBT subband is less than the respective subband EDT.

23. The apparatus of claim 21, further comprising:
means for determining that the channel in the unlicensed spectrum is not available for the data transmission when the energy detected on one or more LBT subbands is equal to or greater than the respective subband EDTs.

24. The apparatus of claim 21, wherein the means for determining that the channel in the unlicensed spectrum is available for the data transmission include:
means for determining that the energy detected on one or more LBT subbands is less than the respective subband EDTs, thereby indicating that the one or more LBT subbands are clear; and
means for determining that the transmission bandwidth over which the data is to be transmitted is within a span of the one or more LBT subbands determined to be clear.

25. The apparatus of claim 19, wherein the means for receiving the message including the sensing bandwidth configuration for the LBT sensing window include means for receiving the message including the sensing bandwidth configuration from a base station in a broadcast message, wherein the sensing bandwidth configuration for the LBT sensing window indicates one of:
that the bandwidth of the LBT sensing window includes an initial uplink (UL) bandwidth part (BWP) when the UE is in a radio resource control (RRC) idle mode; and
that the bandwidth of the LBT sensing window is defined relative to an active UL and downlink (DL) BWP of the UE when the UE is in a RRC connected mode.

26. The apparatus of claim 19, wherein the means for receiving the message including the sensing bandwidth configuration for the LBT sensing window include means for receiving the message including the sensing bandwidth configuration for the LBT sensing window from a base station in a UE-specific message, wherein the UE-specific message includes one or more of:
a radio resource control (RRC) message;
a downlink (DL) medium access control (MAC) control element (CE) message; and
a DL control information (DCI) message.

27. The apparatus of claim 19, further comprising:
means for obtaining a channel occupancy time (COT) for the channel determined to be available for the data transmission; and
means for sending, to a base station, a COT sharing message including an indication of LBT subbands of the of the plurality of LBT subbands of the LBT sensing window that are determined to be clear based on performing the CCA procedure on the at least one LBT subband.

28. The apparatus of claim 27, wherein the indication of LBT subbands of the of the plurality of LBT subbands of the LBT sensing window that are determined to be clear includes one or more of:
a starting frequency of the bandwidth of the LBT sensing window;
an ending frequency of the bandwidth of the LBT sensing window;
a size of the bandwidth of the LBT sensing window;
a size of each LBT subband of the plurality of LBT subbands of the LBT sensing window; and
a bitmap of sensed LBT subbands indicating which LBT subbands are clear and which LBT subbands are not clear based on the CCA procedure.

29. An apparatus configured for wireless communication, the apparatus comprising:
at least one processor; and
a memory coupled to the at least one processor,
wherein the at least one processor is configured to:
receive, by a user equipment (UE), a message including a sensing bandwidth configuration for a listen-before-talk (LBT) sensing window over which the UE is to perform a clear channel assessment (CCA) procedure to determine whether a channel in an unlicensed spectrum is available for a data transmission over a transmission bandwidth, wherein the sensing bandwidth configuration for the LBT sensing window is generated by a network entity for the LBT sensing window based on a sensing bandwidth configured by the network entity and specifies a plurality of LBT subbands of the LBT sensing window for the CCA procedure, and wherein the sensing bandwidth configuration defines one or more of: a bandwidth of a LBT subband of the plurality of LBT subbands of the LBT sensing window, and a size for each of a plurality of LBT subbands of the plurality of LBT subbands of the LBT sensing window;
perform the CCA procedure on at least one LBT subband of the plurality of LBT subbands of the LBT sensing window;
determine, based on performing the CCA procedure on the at least one LBT subband of the plurality of LBT subbands of the LBT sensing window, that the channel in the unlicensed spectrum is available for the data transmission over the transmission bandwidth; and
transmit data of the data transmission over the transmission bandwidth.

30. An apparatus configured for wireless communication, the apparatus comprising:
at least one processor; and
a memory coupled to the at least one processor,
wherein the at least one processor is configured to:
configure, by a base station, a sensing bandwidth for a listen-before-talk (LBT) sensing window;
generate, by the base station, a sensing bandwidth configuration for the LBT sensing window based on the sensing bandwidth, wherein the sensing bandwidth configuration specifies a plurality of LBT subbands of the LBT sensing window over which a user equipment (UE) is to perform a clear channel assessment (CCA) procedure to determine whether a channel in an unlicensed spectrum is available for a data transmission over a transmission bandwidth, wherein the sensing bandwidth configuration defines one or more of: a bandwidth of a LBT subband of the plurality of LBT subbands of the LBT sensing window, and a size for each of a plurality of LBT subbands of the plurality of LBT subbands of the LBT sensing window; and transmit a message including the sensing bandwidth configuration for the LBT sensing window to the UE for the CCA procedure, wherein the UE determines, based on performing the CCA procedure on at least one LBT subband of the plurality of LBT subbands of the LBT sensing window, that the channel in the unlicensed spectrum is available for the data transmission over the transmission bandwidth.

* * * * *